J. H. NONAMAKER
Dumping-Sled.
No 62,435.
Patented Feb. 26, 1867.
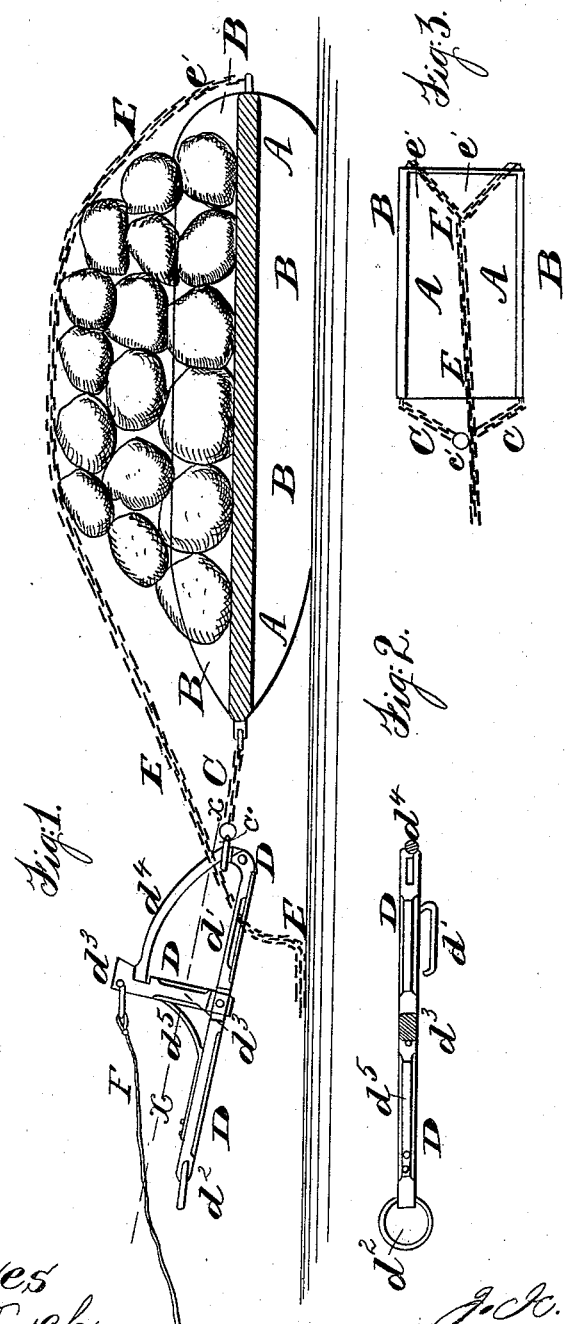

United States Patent Office.

J. H. NONAMAKER, OF MIDDLETOWN, PENNSYLVANIA.

Letters Patent No. 62,435, dated February 26, 1867.

---

IMPROVEMENT IN REVERSIBLE DUMPING-SLEDS.

---

The Schedule referred to in these Letters Patent and making part of the same.

---

TO ALL WHOM IT MAY CONCERN:

Be it known that I, J. H. NONAMAKER, of Middletown, in the county of Dauphin, and State of Pennsylvania, have invented a new and improved Reversible Dumping-Sled; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved sled, showing the form of the sides or runners.
Figure 2 is a detail sectional view of the draught-hook.
Figure 3 is a top view of the sled, showing the arrangement of the chains.
Similar letters of reference indicate like parts.

My invention has for its object to furnish an improved machine for use in cleaning out the manure from stables; in hauling corn, before it has been husked, from one part of the field to another; in hauling dirt from excavations too narrow to admit a cart; in hauling cord-wood from a clearing, and for other similar uses where it is desirable to unload without its being necessary to handle the load piece by piece. And it consists in the construction of the draught-hook, by means of which the draught is transferred from the front to the rear end of the sled for the purpose of dumping the load; by making the sled reversible by forming runners upon both sides of the bottom or floor of the sled; in rounding off both ends of the runners so that the sled may be drawn with either end forward; and in the combination and arrangement of the chains with the ends of the sled and with the draught-hook for the purpose of binding on the load and drawing and dumping the sled; the whole being constructed and arranged as hereinafter more fully described.

A is the bottom or floor of the sled, to the side edges of which are attached the runners B. The runners B are made double, as shown in fig. 1, that is to say, the bottom A has runners upon both sides, so that it may be used either side up with equal facility. Each of the two double runners B may be made in one piece and secured to the side edges of the bottom A, or it may be made in two or more pieces, as may be desired. Both ends of the runners are rounded off, but the rounding off at the forward end is more gradual to enable the sled to more readily pass over obstructions when loaded. C is the draught-chain, the ends of which are attached to the forward end of the sled near the sides, as shown in fig. 3. In the middle of the chain C is placed a ring or enlarged link, $c^1$, for the reception of the draught-hook D. E is the binding and dumping-chain, the rear part of which is divided into two parts or branches, $e^1$ and $e^2$, the ends of which are attached to the rear end of the sled near its sides, as shown in fig. 3. The chain E is of such a length that after passing over the load upon the sled it may be hooked upon the hook $d^1$ formed upon the side of the hook D. D is the draught-hook, to the forward end of which is attached, or upon it is formed, a ring or hook, $d^1$, to which the horse or horses are attached. $d^2$ is an arm, pivoted to the middle part of the body of the hook in such a way that it may have a slight forward and backward movement. Upon the rear side of the arm $d^2$ is formed a notch, as shown in fig. 1, for the reception of the end of the curved arm $d^4$, pivoted to the rear end of the body of the hook D. This arm is of such a size as to readily pass through the ring $c^1$, and its end is of such a form as to fit into the notch formed in the arm $d^2$. $d^5$ is a spring, one end of which is secured to the forward end of the body of the hook, and the other or free end presses against the forward side of the arm $d^2$, holding the hook D locked until released by pulling upon the small cord or chain F attached to the upper end of the arm $d^2$.

In using the sled the hook D is attached to the chain C and the sled loaded. The chain E is then passed over the sled and load, and its forward end attached to the hook $d^1$. Upon arriving at the unloading place a slight pull upon the cord or chain F detaches the hook D, throwing the draught wholly upon the chain E, tipping the sled over forward and dumping the load; and the sled may be drawn back to the place of loading without its having been necessary to stop the horses. The sled thus arrives at the loading place in proper position to be loaded, it being only necessary to turn the horses, which, when the place is contracted, may be done by leading them directly over the sled.

Having thus described my invention, what I claim as new, and desire to secure by Letters Patent, is—

1. The draught-hook D, constructed substantially as herein shown and described and for the purpose set forth.

2. Making the sled reversible by forming runners B upon both sides of its bottom or floor A, substantially as herein shown and described.

3. Rounding off both ends of the runners so that the sled may be drawn with either end forward, substantially as herein shown and described.

4. The combination and arrangement of the chains E and C with the ends of the sled, and with the draught-hook D, substantially as herein shown and described.

J. H. NONAMAKER.

Witnesses:
  YETMAN EVES,
  J. SCHAEFFER.